United States Patent
Andres et al.

(10) Patent No.: US 6,608,418 B2
(45) Date of Patent: Aug. 19, 2003

(54) PERMANENT MAGNET TURBO-GENERATOR HAVING MAGNETIC BEARINGS

(75) Inventors: Mike Andres, Rockford, IL (US); Terry Temple, Stillman Valley, IL (US); Terry Coons, Troy, OH (US)

(73) Assignees: Smiths Aerospace, Inc., Loves Park, IL (US); Electronic Systems Rockford, Loves Park, IL (US)

( * ) Notice: Subject to any disclaimer, the term of this patent is extended or adjusted under 35 U.S.C. 154(b) by 0 days.

(21) Appl. No.: 09/939,469

(22) Filed: Aug. 24, 2001

(65) Prior Publication Data
US 2003/0038553 A1 Feb. 27, 2003

(51) Int. Cl.[7] .................................................. H02K 7/09
(52) U.S. Cl. ....................................................... 310/90.5
(58) Field of Search ............................. 310/90.5; 60/785

(56) References Cited

U.S. PATENT DOCUMENTS

| | | | | |
|---|---|---|---|---|
| 4,983,870 A | * | 1/1991 | McSparran | 310/90.5 |
| 5,126,612 A | * | 6/1992 | Girault | 310/90.5 |
| 5,142,175 A | * | 8/1992 | Watanabe | 310/90.5 |
| 5,285,123 A | * | 2/1994 | Kataoka et al. | 310/88 |
| 5,310,311 A | | 5/1994 | Andres et al. | 415/229 |
| 5,442,905 A | * | 8/1995 | Claeys et al. | 60/785 |
| 5,572,119 A | | 11/1996 | Taylor | 324/207.16 |
| 5,574,345 A | * | 11/1996 | Yoneta et al. | 318/376 |
| 5,627,421 A | | 5/1997 | Miller et al. | 310/90.5 |
| 5,628,191 A | * | 5/1997 | Kueck et al. | 60/655 |
| 5,714,818 A | | 2/1998 | Eakman et al. | 310/90.5 |
| 5,857,348 A | * | 1/1999 | Conry | 62/209 |
| RE36,101 E | * | 2/1999 | Andres et al. | 415/229 |
| 6,255,752 B1 | * | 7/2001 | Werner | 310/90.5 |
| 6,268,674 B1 | * | 7/2001 | Takahashi | 310/90.5 |
| 6,378,293 B1 | * | 4/2002 | Care et al. | 60/226.1 |
| 6,434,943 B1 | * | 8/2002 | Garris | 60/649 |

* cited by examiner

Primary Examiner—Joseph Waks
(74) Attorney, Agent, or Firm—Leydig, Voit & Mayer, Ltd.

(57) ABSTRACT

A turbo-generator machine for producing a supply of cooled air and a supply of electric power has a permanent magnet generator fixed to a shaft which is driven by a turbine rotor, the turbine serving to expand air which is supplied thereto. Magnetic bearings support the shaft radially for rotation about a precisely established axis while a magnetic thrust bearing keeps the shaft in a precisely fixed axial position. Power for the magnetic bearings is supplied by the turbo-generator during operation. Generator air gap is sized in coordination with the magnetic bearing air gap, and the generator stator and shaft are sized to minimize leakage flux from the generator to minimize interaction between the permanent magnet rotor and the magnetic bearings.

23 Claims, 4 Drawing Sheets

PERMANENT MAGNET TURBO-GENERATOR HAVING MAGNETIC BEARINGS

FIELD OF THE INVENTION

The present invention relates generally to turbo-generators, and more particularly to bearing support and control systems for permanent magnet generator based turbo-generators.

BACKGROUND OF THE INVENTION

In airborne applications that require the generation of both cool and conditioned pressurized air as well as the generation of electric power, the use of a turbo-generator driven by engine bleed air provides a compact, contained system that does not adversely affect the performance of the aircraft as compared to, e.g., other generator systems. In a turbo-generator, a shaft is rotatably supported in a housing and serves to connect a permanent magnet generator and a turbine. The pressurized supply air is supplied to and expanded in the turbine where it achieves a very low temperature in order to provide cooling. The compressed air acting on the turbine rotates the shaft which, in turn, drives the permanent magnet generator (PMG). The rotation of the PMG rotor generates a rotating magnetic field in the stator windings. This produces an electric power output whose voltage and frequency are directly related to the speed of rotation of the rotor.

To support the shaft which connects the PMG and the turbine, a turbo-generator typically employs three bearings. Two of the bearings are radial bearings which prevent the shaft from shifting radially. The third bearing is a thrust bearing which holds the shaft in a fixed axial position. If the bearings permit more than just slight amounts of free play, the shaft will shift under influence of the strong permanent magnets of the generator rotor or when the turbine is loaded and will allow the rotor or the blade tips to contact the encircling housing.

In prior turbo-generators, bearings, e.g. ball bearings, hydrodynamic fluid film bearings (commonly called air bearings), etc., have been used to locate the shaft radially and axially since such bearings provide minimal free play. Air bearings, however, require extremely small clearances, require supply air for cooling, and are slightly damaged at each start up and shut down as a result of lack of support at low speeds. Because of the small clearance in the air bearings, dirt or other combination increases the susceptibility for damage and, in addition, such clearances result in relatively high friction and heat. As a result, bearing replacement is a frequent cost item and, if failure occurs during operation, the PMG and/or turbine may be damaged. A shaft which is supported by air bearings must be removed axially from the housing for repair or replacement and this usually requires that the turbo-generator be removed from the aircraft and sent to a remote repair depot.

Magnetic bearings are used for supporting shafts in various types of machinery. In radial magnetic bearings, several electromagnets are spaced angularly around a shaft and, when energized, produce opposing magnetic forces which cause the shaft to levitate in free space within the housing. Sensors detect the actual position of the shaft and vary the energization of the electromagnets in such a manner as to keep the shaft centered precisely on a predetermined axis. One such system is described in U.S. Pat. No. 5,310,311, entitled Air Cycle Machine With Magnetic Bearings, assigned to the assignee of the present application, the teachings and disclosure of which are hereby incorporated in their entireties by reference thereto. While the initial cost of a magnetic bearing system may be somewhat higher than that of an air bearing system, magnetic bearings permit more easily attainable machining tolerances and larger clearances, require no air for cooling, experience a relatively long service life, and are capable of supporting shafts either at rest or operating at speeds of 100,000 RPM or higher.

Despite the clear advantages provided by magnetic bearings, their use has been precluded for PMG-based turbo-generators designed for airborne operation. In these applications, and particularly in fighter aircraft operation, the turbo-generator assembly is highly compact and operates at high rotational speeds in an effort to reduce size and weight. Further, the permanent magnets used in the PMG have a high magnetic density to enable the maximum electrical output generation during operation with minimal weight. As a result of these factors, the environment within the turbo-generator contains a high degree of magnetic flux. Because the control of magnetic bearings relies on precise magnetic flux variation to correct the smallest shaft position variation, use of these devices in the highly magnetic environment of a PMG-based turbo-generator has been precluded. Such is particularly true for fighter aircraft applications in which extremely high dynamic forces caused by aircraft maneuvers are typical.

BRIEF SUMMARY OF THE INVENTION

In view of the above, it is an object of the invention to provide a new and improved turbo-generator machine which utilizes magnetic bearings to precisely support the PMG/turbine shaft for rotation at high speeds in a high vibration, high shock, and high temperature environment such as typically exists in a jet aircraft.

A further object of the invention is to provide a turbo-generator having magnetic bearings and a housing which are uniquely assembled as a clamshell structure permitting relatively quick and easy removal of the shaft from the bearings and the housing for purposes of repairing or replacing the shaft and/or other components of the turbo-generator.

The invention also resides in the use of magnetic force for biasing the shaft radially in opposition to the side forces created by the magnetic flux acting between the permanent magnets and the stator of the PMG. This is aided by the coordination of design parameters such as the ratio between the magnetic bearing air gap and the PMG rotor/stator air gap. Further, precise control of the magnetic bearings is enabled by minimizing the axial magnetic leakage flux from the PMG that is allowed to disrupt the magnetic bearing control and sensing. In one embodiment this is accomplished by controlling the ratio between axial and radial cross section of the PMG stator and the shaft. Further, the system of the present invention allows the magnetic center of the PMG to float within the stator housing, i.e. no mechanical centering is required.

In one embodiment the turbo-generator is a radial inflow turbine with a permanent magnet generator. The turbine and generator are mounted on a single shaft that is supported by magnetic bearings. The turbo-generator includes rotor containment for the high-energy rotors. The magnetic bearing center section uses an axial split feature to allow replacement of the shaft and wheel assembly using common hand tools, thereby providing for high maintainability. This dramatically reduces overhaul time if service is required. The turbo-generator may be used in an exemplary system that provides both cold air for a radar poly alpha olephin (PAO) cooling loop and electrical power for the radar. The system is self-contained except for the bleed air connection, a start-up/shut-down electric power connection and an air exhaust.

In one embodiment of the present invention, a turbo-generator for an aircraft comprises a housing and a shaft disposed in the housing and having a central axis. A permanent magnet generator is mounted on the shaft. Further, a turbine mounted on the shaft in axially spaced relation with the permanent magnet generator. This turbine includes an inlet for receiving gas from an aircraft engine, and is driven by the gas to drive the permanent magnet generator via the shaft. The gas received by the turbine expands therein, is cooled as a result of expanding, and is exhausted as chilled gas by the turbine. Axially spaced bearings for radially supporting the shaft for rotation in the housing are also included. Each of the bearings comprises a number of electromagnets mounted within the housing and spaced angularly around the shaft. The electromagnets include selectively energizable electrical coils for producing magnetic forces to suspend the shaft radially within the housing. Radial position sensors for sensing the radial position of the axis of the shaft are also included. A magnetic bearing controller is responsive to the radial position sensors for varying the energization of the coils to keep the axis of the shaft in coincidence with a predetermined axis. An additional bearing for maintaining the shaft in a predetermined axial position in the housing is also included. This additional bearing comprises axially spaced and axially opposing electromagnets mounted within the housing and positioned substantially coaxial with the shaft. A disc that is rigid with and projects radially from the shaft is located between the axially opposing electromagnets. The axially opposing electromagnets also comprise selectively energizable electrical coils for producing magnetic forces acting in axially opposing relation on the disc. An axial position sensor for detecting the axial position of the shaft is also included. Preferably, the magnetic bearing controller is responsive to the axial position sensor for varying the energization of the coils of the axially opposing electromagnets to keep the shaft in a predetermined axial position.

In an alternate embodiment, radial backup bearings are provided to support the shaft radially when the radial magnetic bearings are not energized. In a further embodiment, axial backup bearings are also provided to support the shaft axially when the axial magnetic bearings are not energized. Preferably, the axial backup bearings are provided integrally with the axial magnetic bearings. In one embodiment, the axial backup bearings are provided by the face of the axial magnetic bearings on which the coils are wound.

In one embodiment the permanent magnet generator includes a permanent magnet rotor mounted on the shaft and a wound stator radially displaced therefrom by a first air gap distance. The bearings for radially supporting the shaft are radially displaced from the shaft by a second air gap distance, which is smaller than the first air gap distance. Preferably, the ratio of the second air gap distance to the first air gap distance ranges between approximately 1:3 and 1:4. In another embodiment the second air gap distance is approximately 0.015", and the first air gap distance is approximately 0.050". In a preferred embodiment, the second air gap distance is sized in relation to the first air gap distance such that the bearings resist side pull forces generated between the permanent magnet rotor and the wound stator.

In an alternate embodiment of the present invention, a magnetic flux cross section in an axial direction is small in relation to a magnetic flux cross section in a radial direction such that magnetic flux leakage from the permanent magnet generator to the bearings does not inhibit the bearings' ability to maintain the axis of the shaft in coincidence with the predetermined axis. In one embodiment, the axial magnetic center of the permanent magnet rotor is allowed to float without mechanical bias thereby reducing thrust loading on the shaft.

In a further embodiment of the invention, the energization of the bearings for radially supporting the shaft is supplied by the magnetic bearing controller from power generated by the permanent magnet generator during operation thereof. Preferably, the energization of the bearings for radially supporting the shaft is supplied by the magnetic bearing controller from aircraft power until the turbine reaches a predetermined minimum speed. In one embodiment, the bearings for radially supporting the shaft comprise four quarter-circular segments positioned angularly around the shaft. In yet a further embodiment of the invention, the energization of the bearings for axially supporting the shaft is supplied by the magnetic bearing controller from power generated by the permanent magnet generator during operation thereof. Preferably, the energization of the bearings for axially supporting the shaft is supplied by the magnetic bearing controller from aircraft power until the turbine reaches a predetermined minimum speed. In an embodiment of the present invention that utilizes magnetic bearings for both radial and axial support of the shaft, the energization of the bearings for both radially and axially supporting the shaft is supplied by the magnetic bearing controller from power generated by the permanent magnet generator during operation thereof. Preferably, the energization of these bearings is supplied by the magnetic bearing controller from aircraft power until the turbine reaches a predetermined minimum speed Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
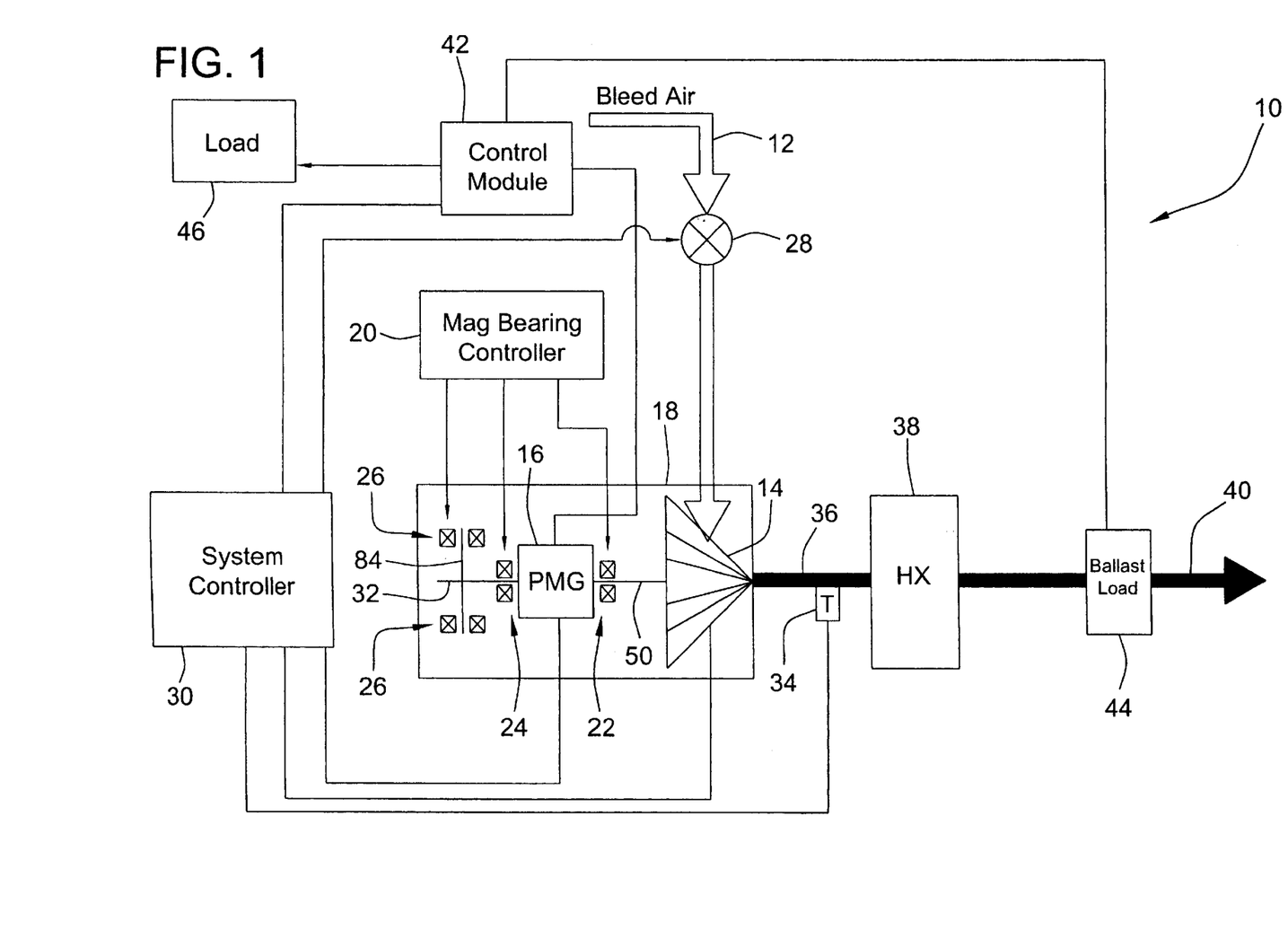
FIG. 1 is a simplified single-line diagram of an exemplary system to which embodiment of the magnetic bearing supported turbo-generator of the present invention is particularly applicable.

For purposes of illustration, the invention has been shown in the drawings as incorporated in a cooling and electric power generation system using the turbo-generator. As applied to an airborne fighter application, the system of the present invention as illustrated in FIG. 1 enables the generation of an amount of cooling necessary to allow the electronic equipment to operate without requiring external ram air for cooling, thereby minimizing the additional drag and related reduction in range that such presents. This underlying cooling system 10 provides, in one embodiment, cooling using bleed air 12 from an engine (not shown) as the energy source. However, it should be noted that other sources of gas, e.g. bottled gas, hydrazine decomposition, compressed gas, etc., may be used as appropriate or desired as will be recognized by those skilled in the art. Therefore, while the following discussion will refer to this source of gas as being bleed air from the engine, such a source should be taken as exemplary only and merely to simplify the discussion.

Preferably, an expansion turbine 14 is used to provide the required temperature reduction of the bleed air 12 from the engine. To ensure that there is adequate loading on this expansion turbine, the system utilizes a permanent magnet generator 16 driven by the expansion turbine 14. However, other types of generators may be used as appropriate or desired, and may be excited by methods well known in the art to generate electric power. This is the mechanism that provides the required load on the expansion turbine 14 to enable the supply of the required cooling. Such an assembly is commonly termed a turbo-generator 18 as will be understood by one skilled in the art. Unique to this application, however, is the inclusion of the magnetic bearings controller 20 and the radial 22, 24 and axial thrust 26 magnetic bearings. In other hybrid bearing applications that use both magnetic bearings and another type of bearing, the magnetic bearing controller 20 may only control the radial magnetic bearings 22, 24 if another type of bearing is used for the axial thrust bearing, or the axial magnetic bearings 26 if another type of radial bearing is used.

To aid in an overall understanding of the operation of the present invention as used in this exemplary cooling and power system, we turn in detail to the simplified illustration of FIG. 1. As shown in this simplified diagram, the gas inlet 12 is controlled through a modulating valve 28 that is controlled by system controller 30 based on the output cooling requirements of this cooling system 10. This gas 12 is used to drive the expansion turbine 14, which, through shaft 32 supported by magnetic bearings 22, 24, 26, drives the permanent magnet generator (PMG) 16. Through the expansion turbine 14, the gas 12 experiences a temperature reduction such that the temperature sensed by temperature probe 34 is less than the temperature of the gas 12. This cool air 36 flows through heat exchanger 38 to remove heat therefrom.

While not shown in this simplified illustration of FIG. 1 the heat exchanger 38 is functionally coupled to the electronic equipment from which it is to remove heat. As will be understood by those skilled in the art, this heat exchanger 38 may represent a single or a plurality of individual components from which heat is to be removed, as well as more sophisticated heat exchange systems in communication through a thermal medium with the components from which heat is to be removed. Such systems include cooling systems that may flow through a thermal circuit coupling multiple components. Once the air has passed through the heat exchanger 38, it is exhausted from the system as illustrated by arrow 40.

The turbo-generator 18 of the present invention includes a generator 16 that is, in an exemplary embodiment, of a permanent magnet type whose output voltage characteristic is proportional to the input speed at which it is driven. During operation, the output power is controlled by the system controller 30 through a control module 42. This control module 42 controllably couples the output to a ballast load 44 and to utilization equipment 46. It should be noted that the coupling of the output power to the utilization equipment 46 through control module 42 is controlled by system controller 30 such that the output power is always available to load 46 as long as this power is within acceptable power quality standards. That is, once the turbo-generator 18 has reached its minimum operational speed the control module 42 is commanded by system controller 30 to couple the output power to the utilization equipment 46.

The control of the coupling of the electric power to the ballast load 44, however, differs significantly from the control of the power to utilization load 46. That is, the system controller 30 coordinates operation and coupling of the output power to the ballast load 44 through control module 42 with the system cooling requirements of the overall system 10. This coordination ensures that a required amount of loading of the expansion turbine 14 necessary to meet the cooling and transient electrical requirements of the system 10 is provided by generator 16. During operation, the system controller 30 varies the total amount of connected load to generator 16 by effectively increasing or decreasing the amount of ballast load 44 connected to the system. This effective increase or decrease of ballast load 44 is also coordinated with the output requirements of the utilization equipment 46 such that, regardless of the necessary loading for turbine 14, the output power quality to the utilization equipment 46 always remains within acceptable limits. This control is described in co-pending application Ser. No. 09/939,236, entitled System And Method For Providing Ballast Loading For A Turbo-Generator, filed on even date herewith, the teachings and disclosure of which are hereby incorporated in their entireties herein by reference thereto.

Figure 2:
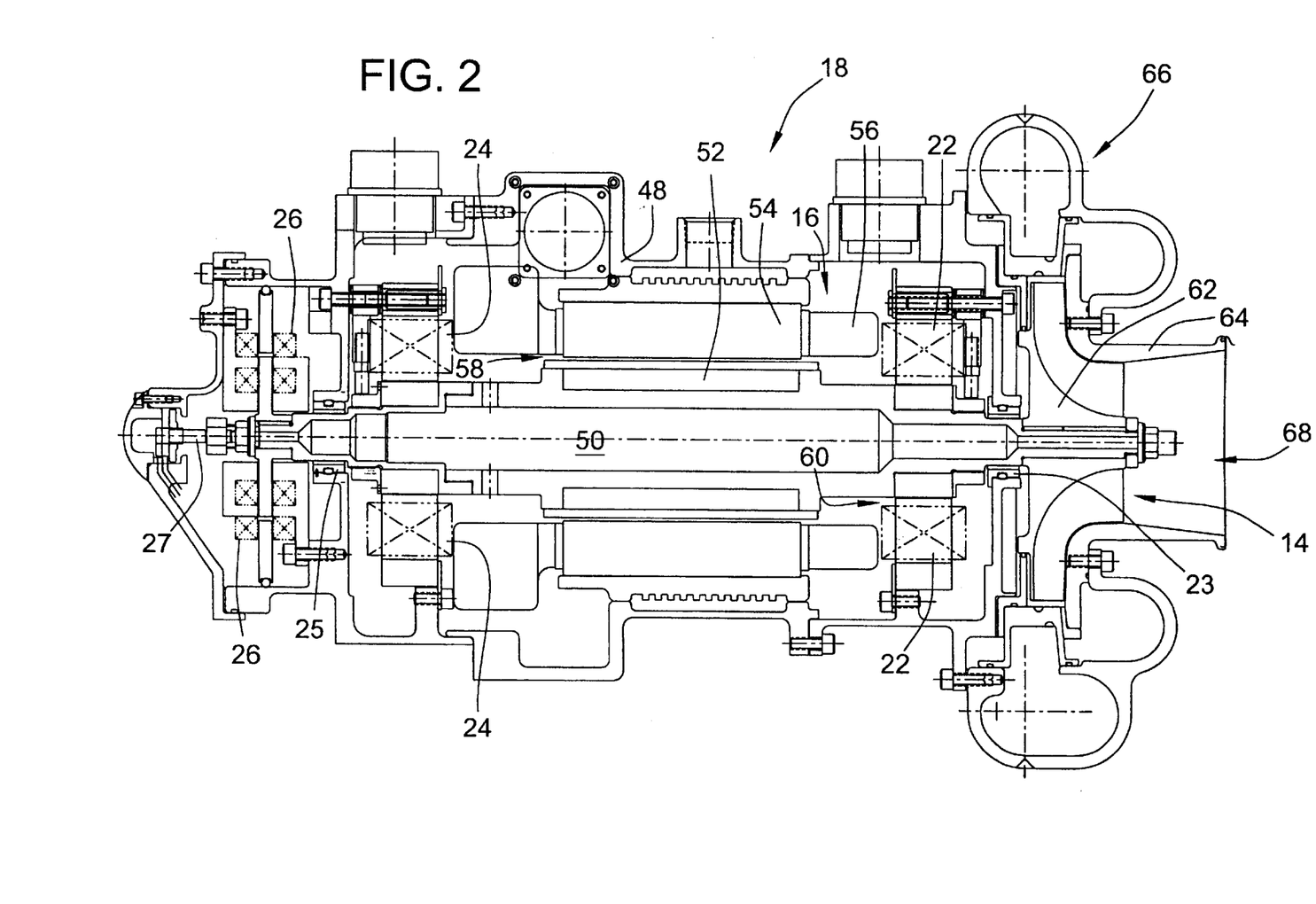
FIG. 2 is a diagrammatic view of an embodiment of the magnetic bearing supported turbo-generator of the present invention.

As illustrated in FIG. 2, the turbo-generator 18 includes a housing 48, a shaft 50 rotatably supported in the housing 48, a permanent magnet generator 16 and a turbine 14 at an end of the housing 48. The permanent magnet generator 16 includes permanent magnet rotor 52 rotatable within a stator 54. The stator 54 comprises two, three-phase windings 56, 30° displaced, wound on a stator 54. The magnetic flux from the PM rotor 52 induces voltage in the stator winding 56 when its flux sweeps the stator 54. The magnitude of the AC voltage depends upon the rotor and stator geometry, materials and speed. The AC voltage is directly proportional to the rotor speed.

As will be recognized by one skilled in the art, the use of any type of generator, and in particular a permanent magnet generator results in a high degree of magnetic flux in the environment of the machine. This is the result of the high magnetic density of the materials used in the permanent magnet generator rotor 52 to maximize the power output and minimize the size and weight of the overall permanent magnetic generator 16. However, the magnetic bearing control relies on very specific adjustments to the magnetic flux generated by the magnetic bearings. Leakage flux from the permanent magnet generator rotor could seriously compromise the magnetic bearing controller's ability to maintain the shaft in a stable position, especially under conditions of changing the electrical load sourced by the PMG. To minimize the amount of stray magnetic flux from the PMG rotor that could likely interact and adversely affect the magnetic bearings 22, 24, the present invention controls the axial magnetic flux path cross-section as compared to the radial cross-section provided by the PMG stator. That is, the size of the shaft 50 is specifically controlled in relation to the radial cross-section of the PMG to minimize adverse in a reaction between the PMG rotor and the magnetic bearings resulting from this stray leakage flux. In this way, no magnetic shielding is required to isolate the PMG from the magnetic bearings, simplifying the overall construction and reducing the weight as a result.

The generator air gaps 58 are coordinated with the radial magnetic bearing air gaps 60 to provide stable operation during start-up and full load operation. Specifically, a ratio between the generator rotor air gap and the radial magnetic bearing air gap is controlled. In addition to the more stable operation during start up in full load, such air gap ratio control allows the magnetic bearings to prevent the side pull that results from the strong magnetic attraction of the rotors permanent magnetics to the stator from affecting operation of the turbo-generator 18. In a preferred embodiment, the air gap ratio of the radial magnetic bearings is kept small versus the PMG air gap. In this way, any radial movement caused from the magnetic attraction between the permanent magnet rotor magnets and the stator may be compensated through act of control through the radial magnetic bearings. In one embodiment, the air gap of the magnetic bearings is approximately 0.015" while the PMG air gap is approximately 0.050". Ratios in the range of approximately 1:3 and 1:4 also provide significant advantage as the magnetic bearings are more easily able to compensate for any radial movement caused by the magnetic rotor of the PMG. Indeed, one skilled in the art will recognize that, while ratios of 1 to 1 may be utilized, more stable operation may be had when the air gap of magnetic bearings is less than the air gap of the PMG machine.

The turbine 14 includes a bladed rotor 62 secured to an end portion of the shaft 50 and rotatable within a stator 64. An inlet plenum or casing 66 is associated with the stator 64 and includes an inlet for admitting gas to the stator 64. Gas is expanded and decreases in temperature across turbine 14 and is discharged through an outlet of the casing 68 to a heat exchanger 38 (FIG. 1). This not only produces the power necessary to drive the permanent magnet generator rotor 52 via the shaft 90 but also produces a flow of air for use in cooling. Herein, the shaft is rotated at speeds well in excess of 100,000 RPM.

To enable the rotors 52 and 62 to rotate within the stators 54 and 64 at high speed and with small clearance, it is necessary that the shaft 50 be supported within the housing 48 to rotate constantly about a precise horizontal axis in spite of load fluctuations on the shaft and in spite of severe vibration, high shock loads and high temperatures which may be imposed on the turbo-generator 10 during operation of the aircraft. In accordance with an embodiment of the present invention, magnetic bearings 22, 24, 26 are utilized to cause the shaft 50 to levitate in free space within the housing 48 and to keep the shaft rotating about a precisely established axis under all load and temperature conditions. The magnetic bearings are far more durable than mechanical bearings and, as will be explained subsequently, provide several advantages over other bearings of the type conventionally used in turbo-generators. Radial backup bearings 23, 25 are also provided to support the shaft 50 when the magnetic bearings 22, 24 are not energized. Additionally, axial backup bearings are also provided. Preferably, the axial backup bearings are provided integrally with the axial magnetic bearings 26. In one embodiment, the axial backup bearings are provided by the face 92 (see FIG. 4) of core 90 of the axial magnetic bearings on which the coils 88 (FIG. 4) are wound. Additionally, it should be recognized that other applications may utilize a hybrid bearing system, wherein another type of bearing may be used in place of either the radial magnetic bearings 22, 24 or the axial thrust bearings 26.

Figure 3:
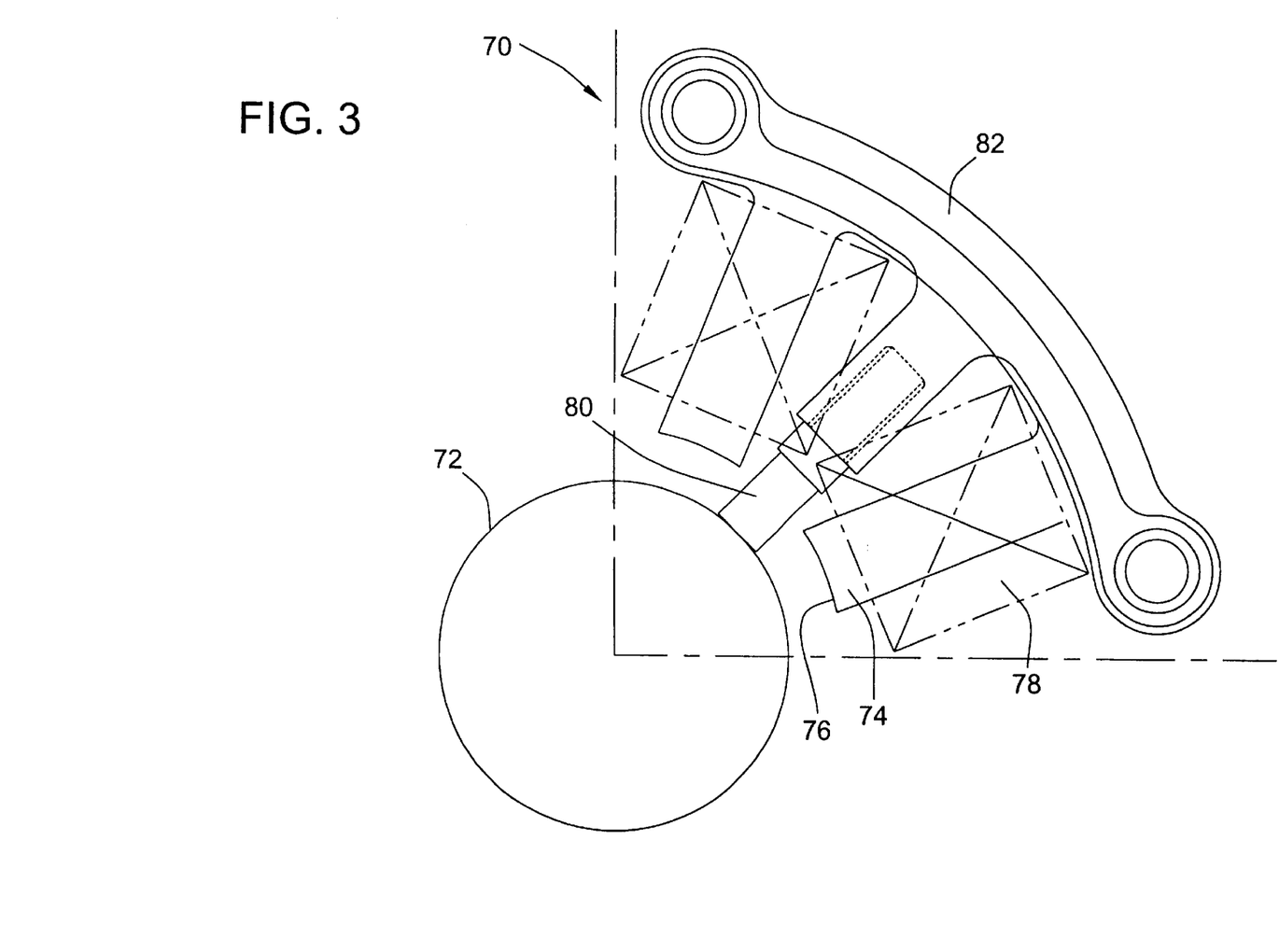
FIG. 3 is a partial isometric view illustrating radial magnetic bearing construction and placement relative to a cross-section of the turbo-generator shaft of an embodiment of the present invention.

More specifically and with reference to FIG. 3, four axially spaced magnetic bearings are used to form bearings 22, 24 and are located in encircling relation with the shaft 50 at either end of the permanent magnet generator 16. They serve to support the shaft 50 radially within the housing 48. The four radial bearings 22, 24 are identical and thus only one need be described. In general terms, it comprises a plurality of electromagnets 70 supported by the housing 48 and spaced equally around a collar 72 fixed to the shaft 50 and made of a material having high magnetic saturation. The number of electromagnets employed may vary but typically eight electromagnets are spaced around the collar. The electromagnets are arranged in pairs with the two electromagnets of each pair being of opposite polarity and with adjacent electromagnets of adjacent pairs being of the same polarity.

The electromagnets 70 for each radial bearing 22, 24 are illustrated schematically in FIG. 3. As shown, each electromagnet comprises a core 74 defining a pole piece and having an arcuate pole face 76 concentric with the collar 72 and spaced therefrom by a narrow radial air gap of approximately 15 mils. An electrical coil 78 is wound around each core and is adapted to be energized by way of a magnetic bearing controller 20 shown schematically in FIG. 1. Non-contacting position sensors 80 are spaced angularly around a collar 82 adjacent the collar 72 to detect the actual radial position to the shaft 50 and to transmit signals representative of that position to the controller 20. Position sensor signals are sent through the feedback circuit, along with the position command, into the bearing control and coil drive circuits. The sensor signal is a voltage that varies inversely with the distance from the shaft. There are ten of these coil drive circuits: four for the radial bearing coils that support each end of the PMG, and a set of two for the thrust bearing coils 26.

When the coils 78 are energized, the electromagnets 70 of the two bearings 22, 24 create magnetic fields which coact with the collars 72 to cause the shaft 50 to levitate out of physical contact with the radial backup bearings 23, 25 (FIG. 2). The radial location of the shaft is constantly monitored by the sensors 80 and, if the shaft deviates radially from a precisely established axis, the shaft controller 20 adjusts the current supplied to the electromagnets and causes the shaft to be brought back into its proper position.

Figure 4:
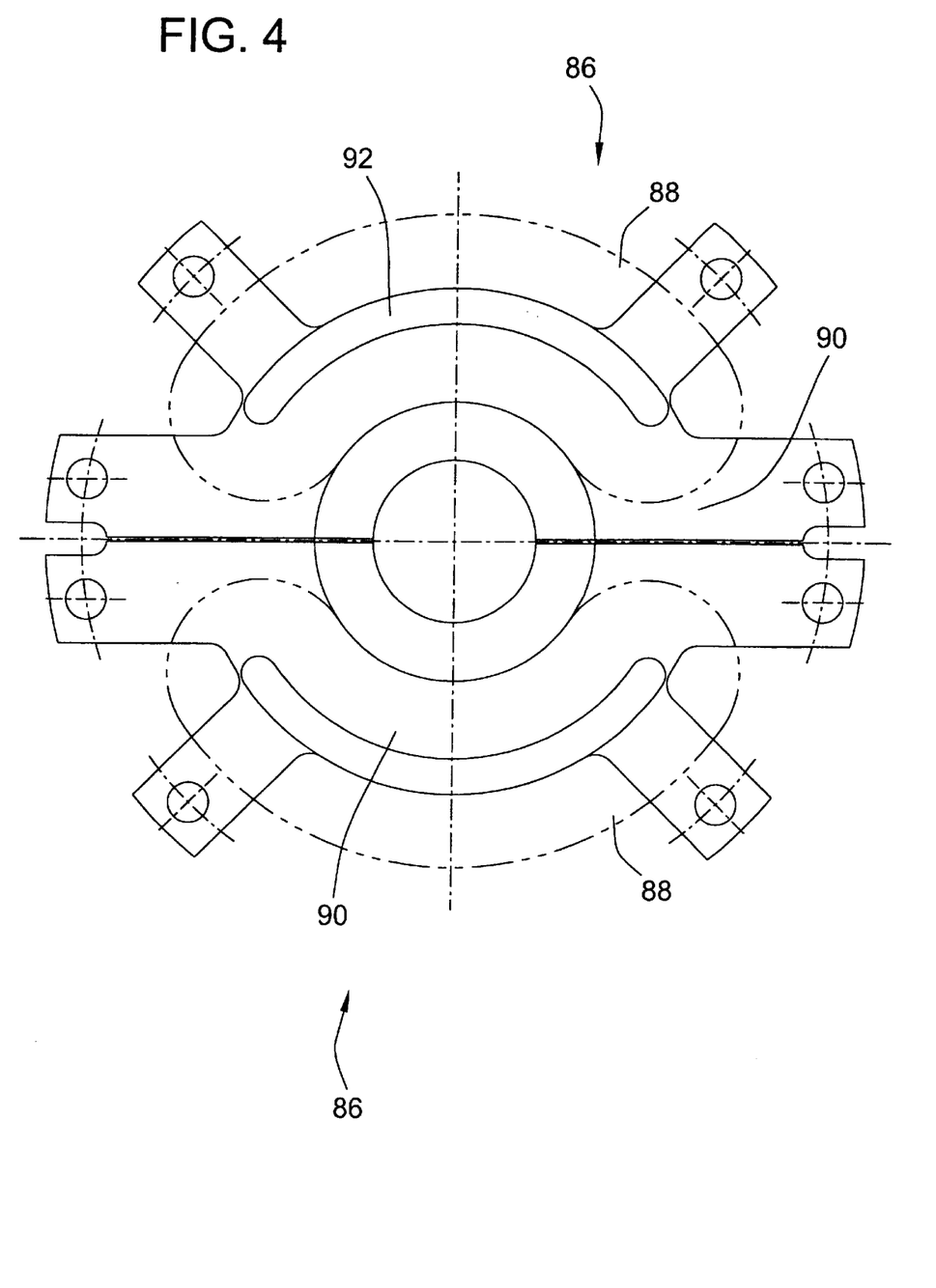
FIG. 4 is a simplified partial view illustrating axial thrust magnetic bearing construction of an embodiment of the present invention.

Provision is made of a magnetic thrust bearing 26 for keeping the shaft 50 in a predetermined axial position in the housing 48. The thrust bearing 26 is located at one end of the shaft and herein comprises a disc 84 (see FIG. 1) fixed to and projecting radially from the shaft 50. In addition, the thrust bearing comprises axially spaced and axially opposing electromagnets 86 fixed to the housing 48 and located on opposite sides of the disc. Two electromagnets 86 are positioned on each side of the disc as illustrated in FIG. 4.

In this instance, each electromagnet 86 of the thrust bearing 26 includes a metal core 80 having an annular pole face disposed in opposing relation with the disc 84 and spaced from the disc by a narrow axial air gap of approximately 0.010". An electrical coil 88 is wound around each core 90 and is operable when energized to interact with the disc to produce magnetic flux tending to attract the disc axially toward the respective electromagnet. The coils are adapted to be energized by current supplied by the PMG via the controller 20. A non-contacting position sensor 27 (see FIG. 2) also is associated with the thrust controller, detects the actual axial position of the shaft 16 and transmits a signal representative of that position to the controller.

The axially spaced electromagnets 86 of the thrust bearing 26 exert axially opposing magnetic forces on the disc 84 to hold the shaft 50 in a predetermined axial position. If the shaft deviates from that position, the controller 20 adjusts the current supplied to the electromagnets 86 on either or both sides of the disc in order to return the shaft to its proper axial position.

Backup mechanical bearings are provided in order to support the shaft 50 when the shaft is stationary and also for a relatively short period of time (e.g., seven seconds maximum) in the event power to the electromagnets is lost. In this instance, the backup bearings include stationary bushings which are mounted in the end walls of the housing 15. The bushings support the end portions of the shaft.

As compared to air bearings, the use of the magnetic bearings 22, 24, 26 in the turbo-generator 18 offers several advantages. Running clearances in air bearings need to be held very tight whereas the running clearances permitted with respect to the magnetic bearings are significantly more relaxed, e.g. about +/−0.005". The relatively large bearing clearance of the magnetic bearings results in less sensitivity to debris, and therefore lower friction and heat. In addition, the relatively large clearance decreases the chances of the magnetic bearings being damaged by dirt or other contamination. The magnetic bearings are not subjected to damage during start up and shut down and this, when taken with the factors discussed above, significantly increases the service life of the bearings and significantly reduces maintenance costs.

Further in accordance with the invention, the housing 48 and the bearings 22, 24, 26 are uniquely constructed to enable access to be gained to the shaft 50 and the interior of the housing for repair purposes without need of withdrawing the shaft axially out of the housing and the bearings. As a result, complete turbo-generator overhaul may be performed on location without sending the machine to a repair depot.

Specifically, the foregoing is achieved by forming the housing 48 as a split assembly having two housing sections. The two housing sections are formed with mounting flanges having holes for receiving fasteners such as screws. When the housing sections are assembled on the shaft 50, the mounting flanges of the housing sections are disposed in face-to-face engagement, and the interface between the mating flanges lies in a plane which substantially coincides with a plane containing the axis of the shaft. The housing sections are held in assembled relation by virtue of the screws extending through the holes in the flanges. By removing the screws, either housing section may be removed from the shaft by pulling the housing section radially away from the shaft. Thus, the housing sections are like a clam shell and may be opened up to afford access to the shaft without need of withdrawing the shaft axially from the housing.

The bearings 22, 24, 26 also are of a clamshell nature in that the bearings and the bushings are split on the axis of the shaft 50 so as to permit radial disassembly of the housing sections in the manner described above. As shown most clearly in FIGS. 2 and 3, each of the radial bearings 22, 24 is constructed as split modules, each module containing two electromagnets 70 and each having a generally quarter-circular mounting bracket for supporting the electromagnets. Similarly, each axially spaced component of the thrust bearing 26 is constructed as two split modules having generally semicircular mounting brackets. Each module of each axially spaced component of the thrust bearing contains an electromagnet.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A turbo-generator, comprising:

a housing;

a shaft disposed in the housing and having a central axis;

a permanent magnet generator mounted on the shaft;

a turbine mounted on the shaft in axially spaced relation with the permanent magnet generator and having inlet means for receiving gas, the turbine being driven by the gas and acting through the shaft to drive the permanent magnet generator, the gas received by the turbine expanding therein, being cooled as a result of expanding and being exhausted as a chilled gas by the turbine;

a collar fixed to the shaft, the collar being made of a non-permanent-magnetic material having high magnetic saturation;

axially spaced bearings for radially supporting the shaft for rotation in the housing, each of the bearings comprising a plurality of electromagnets mounted within the housing and spaced angularly around the collar, the electromagnets comprising selectively energizable electrical coils for producing magnetic forces suspending the shaft radially within the housing;

radial position sensors for sensing the radial position of the axis of the shaft;

a magnetic bearing controller responsive to the radial position sensors for varying the energization of the coils to keep the axis of the shaft in coincidence with a predetermined axis;

an additional bearing for maintaining the shaft in a predetermined axial position in the housing, the additional bearing comprising axially spaced and axially opposing electromagnets mounted within the housing and positioned substantially coaxial with the shaft;

a disc rigid with and projecting radially from the shaft and located between the axially opposing electromagnets, the axially opposing electromagnets comprising selectively energizable electrical coils for producing magnetic forces acting in axially opposing relation on the disc;

an axial position sensor for detecting the axial position of the shaft; and wherein the magnetic bearing controller is responsive to the axial position sensor for varying the energization of the coils of the axially opposing electromagnets to keep the shaft in a predetermined axial position.

2. A turbo-generator, comprising:

a housing;

a shaft disposed in the housing and having a central axis;

a permanent magnet generator mounted on the shaft;

a turbine mounted on the shaft in axially spaced relation with the permanent magnet generator and having inlet means for receiving gas, the turbine being driven by the gas and acting through the shaft to drive the permanent magnet generator, the gas received by the turbine expanding therein, being cooled as a result of expanding and being exhausted as a chilled gas by the turbine;

axially spaced bearings for radially supporting the shaft for rotation in the housing, each of the bearings comprising a plurality of electromagnets mounted within the housing and spaced angularly around the shaft, the electromagnets comprising selectively energizable electrical coils for producing magnetic forces suspending the shaft radially within the housing;

radial position sensors for sensing the radial position of the axis of the shaft;

a magnetic bearing controller responsive to the radial position sensors for varying the energization of the coils to keep the axis of the shaft in coincidence with a predetermined axis;

an additional bearing for maintaining the shaft in a predetermined axial position in the housing, the additional bearing comprising axially spaced and axially opposing electromagnets mounted within the housing and positioned substantially coaxial with the shaft;

a disc rigid with and projecting radially from the shaft and located between the axially opposing electromagnets, the axially opposing electromagnets comprising selectively energizable electrical coils for producing magnetic forces acting in axially opposing relation on the disc;

an axial position sensor for detecting the axial position of the shaft;

wherein the magnetic bearing controller is responsive to the axial position sensor for varying the energization of the coils of the axially opposing electromagnets to keep the shaft in a predetermined axial position; and wherein the permanent magnet generator includes a permanent magnet rotor mounted on the shaft and a wound stator radially displaced therefrom by a first air gap distance, wherein the bearings for radially supporting the shaft are radially displaced therefrom by a second air gap distance, the second air gap distance being smaller than the first air gap distance.

3. The turbo-generator of claim 2, wherein a ratio of the second air gap distance to the first air gap distance is between approximately 1:3 and 1:4.

4. The turbo-generator of claim 2, wherein the second air gap distance is approximately 0.015", and wherein the first air gap distance is approximately 0.050".

5. The turbo-generator of claim 2, wherein a magnetic flux cross section in an axial direction is small in relation to a magnetic flux cross section in a radial direction such that magnetic flux leakage from the permanent magnet generator to the bearings does not inhibit the bearings' ability to maintain the axis of the shaft in coincidence with the predetermined axis.

6. The turbo-generator of claim 2, wherein an axial magnetic center of the permanent magnet rotor is allowed to float without mechanical bias thereby reducing thrust loading on the shaft.

7. The turbo-generator of claim 2, wherein the energization of the bearings for radially supporting the shaft is supplied by the magnetic bearing controller from power generated by the permanent magnet generator during operation thereof.

8. The turbo-generator of claim 7, wherein the energization of the bearings for radially supporting the shaft is supplied by the magnetic bearing controller from aircraft power until the turbine reaches a predetermined minimum speed.

9. The turbo-generator of claim 2, wherein the energization of the bearings for axially supporting the shaft is supplied by the magnetic bearing controller from power generated by the permanent magnet generator during operation thereof.

10. A turbo-generator, comprising:

a housing;

a shaft disposed in the housing and having a central axis;

a permanent magnet generator mounted on the shaft;

a turbine mounted on the shaft in axially spaced relation with the permanent magnet generator and having inlet means for receiving gas, the turbine being driven by the gas and acting through the shaft to drive the permanent magnet generator, the gas received by the turbine expanding therein, being cooled as a result of expanding and being exhausted as a chilled gas by the turbine;

axially spaced bearings for radially supporting the shaft for rotation in the housing, each of the bearings comprising a plurality of electromagnets mounted within the housing and spaced angularly around the shaft, the electromagnets comprising selectively energizable electrical coils for producing magnetic forces suspending the shaft radially within the housing;

radial position sensors for sensing the radial position of the axis of the shaft;

a magnetic bearing controller responsive to the radial position sensors for varying the energization of the coils to keep the axis of the shaft in coincidence with a predetermined axis;

an additional bearing for maintaining the shaft in a predetermined axial position in the housing, the additional bearing comprising axially spaced and axially opposing electromagnets mounted within the housing and positioned substantially coaxial with the shaft;

a disc rigid with and projecting radially from the shaft and located between the axially opposing electromagnets, the axially opposing electromagnets comprising selectively energizable electrical coils for producing magnetic forces acting in axially opposing relation on the disc;

an axial position sensor for detecting the axial position of the shaft;

wherein the magnetic bearing controller is responsive to the axial position sensor for varying the energization of the coils of the axially opposing electromagnets to keep the shaft in a predetermined axial position; and wherein the permanent magnet generator includes a permanent magnet rotor mounted on the shaft and a wound stator radially displaced therefrom by a first air gap distance, wherein the bearings for radially supporting the shaft are radially displaced therefrom by a second air gap distance, the second air gap distance being sized in relation to the first air gap distance such that the bearings resist side pull forces generated between the permanent magnet rotor and the wound stator.

11. A turbo-generator, comprising:

a housing;

a shaft disposed in the housing and having a central axis;

a permanent magnet generator mounted on the shaft;

a turbine mounted on the shaft in axially spaced relation with the permanent magnet generator and having inlet means for receiving gas, the turbine being driven by the gas and acting through the shaft to drive the permanent magnet generator, the gas received by the turbine expanding therein, being cooled as a result of expanding and being exhausted as a chilled gas by the turbine;

axially spaced bearings for radially supporting the shaft for rotation in the housing, each of the bearings comprising a plurality of electromagnets mounted within the housing and spaced angularly around the shaft, the electromagnets comprising selectively energizable electrical coils for producing magnetic forces suspending the shaft radially within the housing;

radial position sensors for sensing the radial position of the axis of the shaft;

a magnetic bearing controller responsive to the radial position sensors for varying the energization of the coils to keep the axis of the shaft in coincidence with a predetermined axis;

an additional bearing for maintaining the shaft in a predetermined axial position in the housing, the additional bearing comprising axially spaced and axially opposing electromagnets mounted within the housing and positioned substantially coaxial with the shaft;

a disc rigid with and projecting radially from the shaft and located between the axially opposing electromagnets, the axially opposing electromagnets comprising selectively energizable electrical coils for producing magnetic forces acting in axially opposing relation on the disc;

an axial position sensor for detecting the axial position of the shaft;

wherein the magnetic bearing controller is responsive to the axial position sensor for varying the energization of the coils of the axially opposing electromagnets to keep the shaft in a predetermined axial position; and wherein the bearings for radially supporting the shaft comprise four quarter-circular segments positioned angularly around the shaft.

12. A turbo-generator, comprising:

a housing;

a shaft disposed in the housing;

a permanent magnet generator mounted on the shaft;

a turbine mounted on the shaft in axially spaced relation with the generator and having inlet for receiving a flow of air and an outlet for discharging cooled air, the turbine being driven by the air and acting through the shaft to drive the generator;

a collar fixed to the shaft, the collar being made of a non-permanent-magnetic material having high magnetic saturation;

magnetic bearings for radially supporting the shaft for rotation in the housing, the magnetic bearings positioned on either end of the generator and spaced angularly around the collar;

radial position sensors for sensing the radial position of the shaft; and a magnetic bearing controller responsive to the radial position sensors for varying the energization of the magnetic bearings to keep the shaft in coincidence with a predetermined axis.

13. The turbo-generator of claim 12, further comprising:

an additional bearing for maintaining the shaft in a predetermined axial position in the housing, the additional bearing comprising axially spaced and axially opposing electromagnets mounted within the housing and positioned substantially coaxial with the shaft;

a disc rigid with and projecting radially from the shaft and located between the axially opposing electromagnets, the axially opposing electromagnets comprising selectively energizable electrical coils for producing magnetic forces acting in axially opposing relation on the disc;

axial position sensor for detecting the axial position of the shaft; and wherein the magnetic bearing controller is responsive to the axial position sensor for varying the energization of the coils of the axially opposing electromagnets to keep the shaft in a predetermined axial position.

14. A turbo-generator, comprising:

a housing;

a shaft disposed in the housing;

a generator mounted on the shaft;

a turbine mounted on the shaft in axially spaced relation with the generator and having inlet for receiving a flow of air and an outlet for discharging cooled air, the turbine being driven by the air and acting through the shaft to drive the generator;

magnetic bearings for radially supporting the shaft for rotation in the housing, the magnetic bearings positioned on either end of the generator and spaced angularly around the shaft;

radial position sensors for sensing the radial position of the shaft;

a magnetic bearing controller responsive to the radial position sensors for varying the energization of the magnetic bearings to keep the shaft in coincidence with a predetermined axis; and wherein the generator includes a permanent magnet rotor mounted on the shaft and a wound stator radially displaced therefrom by a first air gap distance, wherein the magnetic bearings are radially displaced from the shaft by a second air gap distance, the second air gap distance being smaller than the first air gap distance.

15. The turbo-generator of claim 14, wherein a ratio of the second air gap distance to the first air gap distance is between approximately 1:3 and 1:4.

16. The turbo-generator of claim 14, wherein the second air gap distance is approximately 0.015", and wherein the first air gap distance is approximately 0.050".

17. The turbo-generator of claim 14, wherein the generator includes a permanent magnet rotor mounted on the shaft and a wound stator radially displaced therefrom, and wherein an axial magnetic center of the permanent magnet rotor is allowed to float without mechanical bias thereby reducing thrust loading on the shaft.

18. The turbo-generator of claim 14, wherein the energization of the magnetic bearings is supplied by the magnetic bearing controller from power generated by the generator during operation thereof.

19. The turbo-generator of claim 18, wherein the energization of the magnetic bearings is supplied by the magnetic bearing controller from aircraft power while the turbine is operating below a predetermined minimum speed.

20. A turbo-generator, comprising:

a housing;

a shaft disposed in the housing;

a generator mounted on the shaft;

a turbine mounted on the shaft in axially spaced relation with the generator and having inlet for receiving a flow of air and an outlet for discharging cooled air, the turbine being driven by the air and acting through the shaft to drive the generator;

magnetic bearings for radially supporting the shaft for rotation in the housing, the magnetic bearings positioned on either end of the generator and spaced angularly around the shaft;

radial position sensors for sensing the radial position of the shaft;

a magnetic bearing controller responsive to the radial position sensors for varying the energization of the magnetic bearings to keep the shaft in coincidence with a predetermined axis; and wherein the generator includes a permanent magnet rotor mounted on the shaft and a wound stator radially displaced therefrom by a first air gap distance, wherein the magnetic bearings are radially displaced from the shaft by a second air gap distance, the second air gap distance being sized in relation to the first air gap distance such that the magnetic bearings compensate for side pull forces generated between the permanent magnet rotor and the wound stator.

21. A turbo-generator, comprising:

a housing;

a shaft disposed in the housing;

a generator mounted on the shaft;

a turbine mounted on the shaft in axially spaced relation with the generator and having inlet for receiving a flow of air and an outlet for discharging cooled air, the turbine being driven by the air and acting through the shaft to drive the generator;

magnetic bearings for radially supporting the shaft for rotation in the housing, the magnetic bearings positioned on either end of the generator and spaced angularly around the shaft;

radial position sensors for sensing the radial position of the shaft;

a magnetic bearing controller responsive to the radial position sensors for varying the energization of the magnetic bearings to keep the shaft in coincidence with a predetermined axis; and wherein the generator includes a permanent magnet rotor mounted on the shaft and a wound stator radially displaced therefrom, and wherein a magnetic flux cross section in an axial direction is small in relation to a magnetic flux cross section in a radial direction such that magnetic flux leakage from the permanent magnet generator to the magnetic bearings does not inhibit the magnetic bearings' ability to maintain the shaft in coincidence with the predetermined axis.

22. A turbo-generator, comprising:

a housing;

a shaft disposed in the housing;

a generator mounted on the shaft;

a turbine mounted on the shaft in axially spaced relation with the generator and having inlet for receiving a flow of air and an outlet for discharging cooled air, the turbine being driven by the air and acting through the shaft to drive the generator;

magnetic bearings for radially supporting the shaft for rotation in the housing, the magnetic bearings positioned on either end of the generator and spaced angularly around the shaft;

radial position sensors for sensing the radial position of the shaft;

a magnetic bearing controller responsive to the radial position sensors for varying the energization of the magnetic bearings to keep the shaft in coincidence with a predetermined axis; and wherein the magnetic bearings comprise four quarter-circular segments positioned angularly around the shaft.

23. A turbo-generator, comprising:

a housing;

a shaft disposed in the housing;

a permanent magnet generator mounted on the shaft;

a turbine mounted on the shaft in axially spaced relation with the permanent magnet generator and having inlet for receiving a flow of air and an outlet for discharging cooled air, the turbine being driven by the air and acting through the shaft to drive the permanent magnet generator; a bearing for maintaining the shaft in a predetermined axial position in the housing, the bearing comprising axially spaced and axially opposing electromagnets mounted within the housing and positioned substantially coaxial with the collar;

a disc rigid with and projecting radially from the shaft and located within the housing between the axially opposing electromagnets, the disc being made of a non-permanent-magnetic material, the axially opposing electromagnets comprising selectively energizable electrical coils for producing magnetic forces acting in axially opposing relation on the disc;

axial position sensor for detecting the axial position of the shaft; and a magnetic bearing controller responsive to the axial position sensor for varying the enerization of the coils of the axially opposing electromagnets to keep the shaft in a predetermined axial position.

* * * * *